(12) United States Patent
Bassett

(10) Patent No.: US 7,067,933 B2
(45) Date of Patent: Jun. 27, 2006

(54) WASTE OIL ELECTRICAL GENERATION SYSTEM

(76) Inventor: Terry Edgar Bassett, 5120 S. Dorsey La., Tempe, AZ (US) 85282

(*) Notice: Subject to any disclaimer, the term of this patent is extended or adjusted under 35 U.S.C. 154(b) by 136 days.

(21) Appl. No.: 10/705,578

(22) Filed: Nov. 10, 2003

(65) Prior Publication Data

US 2004/0093864 A1 May 20, 2004

Related U.S. Application Data (60) Provisional application No. 60/425,605, filed on Nov. 12, 2002.

(51) Int. Cl.
- B60L 1/02 (2006.01)
- F01K 15/00 (2006.01)
- F01B 29/10 (2006.01)
- F02G 1/04 (2006.01)
- F02C 7/08 (2006.01)

(52) U.S. Cl. .............. 290/2; 60/517; 60/520; 60/39.5

(58) Field of Classification Search .......... 60/520, 60/39.05, 618, 517, 685, 657, 653; 290/1 R, 290/2, 52
See application file for complete search history.

(56) References Cited

U.S. PATENT DOCUMENTS

| | | | | |
|---|---|---|---|---|
| 3,678,284 | A | * | 7/1972 | Peters ................ 290/1 R |
| 4,031,404 | A | * | 6/1977 | Martz et al. .......... 290/40 R |
| 4,049,299 | A | * | 9/1977 | Rigollot .............. 290/52 |
| 4,161,657 | A | * | 7/1979 | Shaffer, Jr. ........... 290/1 R |
| 4,392,353 | A | * | 7/1983 | Shibuya et al. ......... 60/657 |
| 4,511,805 | A | | 4/1985 | Boy-Marcotte et al. |
| 5,826,518 | A | | 10/1998 | Bhat et al. |
| 6,167,691 | B1 | * | 1/2001 | Yoshikawa et al. ...... 60/39.12 |
| 6,525,431 | B1 | * | 2/2003 | Clucas et al. ............ 290/2 |
| 6,663,752 | B1 | * | 12/2003 | Santilli ................ 204/164 |
| 6,729,246 | B1 | * | 5/2004 | Lo ..................... 110/233 |
| 6,784,562 | B1 | * | 8/2004 | Gennesseaux ............. 290/2 |
| 2003/0213246 | A1 | * | 11/2003 | Coll et al. .............. 60/653 |

* cited by examiner

*Primary Examiner*—Julio Gonzalez Ramirez
(74) *Attorney, Agent, or Firm*—Stoneman Law Offices, Ltd.; Martin L. Stoneman; Benjamin K. Erlick (57) ABSTRACT

An improved electrical generation system utilizing environmentally hazardous waste oils as a combustible fuel. More particularly, a system to generate electrical power using a Stirling-cycle engine driving an electrical generator. The Stirling-cycle engine is powered by the heat energy produced by a waste-oil-fired furnace. The system is of a co-generation type, producing electricity and a combination of space heating and hot water.

23 Claims, 6 Drawing Sheets

WASTE OIL ELECTRICAL GENERATION SYSTEM

CROSS-REFERENCE TO RELATED APPLICATION

The present application is related to prior provisional application Ser. No. 60/425,605, filed Nov. 12, 2002, entitled "WASTE OIL ELECTRICAL GENERATION SYSTEM", from which priority is claimed, the contents of which are incorporated herein by this reference and are not admitted to be prior art with respect to the present invention by the mention in this cross-reference section.

BACKGROUND

This invention relates to providing an improved electrical generation system utilizing waste oil as a combustible fuel. More particularly, this invention relates to the co-generation of electrical power using a generator powered by the heat energy produced by a waste-oil-fired furnace.

Approximately 1.4 billion gallons of used oil is generated in the United States each year. Approximately ten percent of that amount is properly recycled, with the remainder dumped into the environment. Waste oil dumping has increasingly become a major worldwide environmental issue. It has been shown that one gallon of waste oil can contaminate up to one million gallons of water. Currently, forty percent of the pollution found in the waterways of the United States is created by waste oil, with similar pollution statistics reported by other industrialized countries.

In 1980 the U.S. Congress passed the Used Oil Recycling Act to establish a national policy governing used oil. One significant aspect of the legislation was the acceptance of on-site burning of waste oil to produce usable heat. Government leaders recognized that making used oil valuable for hundreds of thousands of small businesses was the best way to prevent dumping and water pollution.

In the United States, the Environmental Protection Agency (EPA) currently acts to establish, monitor and manage waste oil control guidelines in an attempt reduce hazardous environmental waste oil contamination from waste oil dumping. The EPA's rule generally states:

Title 40—Protection of Environment
Part 279—Standards for the Management of Used Oil—
  Table of Contents
  Subpart C—Standards for Used Oil Generators Sec. 279.23 On-site burning in space heaters.
Generators may burn used oil in used oil-fired space heaters provided that:
(a) The heater burns only used oil that the owner or operator generates or used oil received from household do-it-yourself used oil generators;
(b) The heater is designed to have a maximum capacity of not more than 0.5 million Btu per hour; and
(c) The combustion gases from the heater are vented to the ambient air.

[57 FR 41612, Sep. 10, 1992, as amended at 58 FR 26425, May 3, 1993]

Efficient burning of waste oil is a relatively complex problem. Typically, the waste oil being burned is a mixture of several oil types, each having unique physical characteristics (such as varying densities and flow viscosities).

There are a number of manufacturers that have developed efficient waste oil burners, currently marketing their products throughout the world. The outputs of the burners are currently limited to hot air for space heating and/or usable hot water. These units are sold to businesses that generate waste (used) oil from their operations. They include businesses, such as automotive repair shops, retail outlets that sell oil to consumers, truck shops, farm equipment, heavy equipment, dealerships, bus fleets, commercial fleets, municipalities, construction and mining companies, recycling and landfill centers, manufacturing facilities, and food production/restaurants. The EPA and CE have approved this type of waste oil burning process without a permit, as long as the EPA's burning criteria are met (as noted above).

Despite the high level of efficiency of current waste oil burners, as much as seventy percent of the combustion heat produced by a unit is lost as exhaust. It is clear that a need exists for an improved waste oil burning system that better utilizes valuable generated heat energy currently lost from existing systems.

OBJECTS OF THE INVENTION

It is an object and feature of the present invention to provide an effective, efficient system for the combustion of waste oil.

It is a further object and feature of the present invention to provide such a system that utilizes Stirling-cycle engines.

It is a further object and feature of the present invention to provide such a system that utilizes such Stirling-cycle engines to provide electrical energy.

It is a further object and feature of the present invention to provide such a system that utilizes the combustion energy of the waste oil to provide space heating.

It is a further object and feature of the present invention to provide such a system that utilizes the combustion energy of the waste oil to provide a usable hot water source.

It is a further object and feature of the present invention to provide such a system that is capable of supplying excess generated electrical power to a larger electrical power grid.

It is a further object and feature of the present invention to provide such a system that is capable of storing excess generated electrical power in a battery storage system.

It is a further object and feature of the present invention to provide such a system that is capable of economically disposing of environmentally-hazardous waste oil.

A further primary object and feature of the present invention is to provide such a system that is efficient, inexpensive and handy. Other objects and features of this invention will become apparent with reference to the following descriptions.

SUMMARY OF THE INVENTION

An electrical generation system comprising: electrical circuit means for utilizing electrical power; connected to such electrical circuit means, stirling-cycle power means for using the mechanical output of at least one Stirling cycle to produce electrical power; holding means for holding environmentally hazardous waste oils; combustion heat means for producing combustion heat by burning such environmentally hazardous waste oils; waste oil transfer means for transferring such environmentally hazardous waste oils from such holding means to such combustion heat means; and primary heat transfer means for transferring of such combustion heat to such Stirling-cycle means; wherein such primary heat transfer means is in operational communication with such combustion heat means; and wherein such environmentally hazardous waste oils may be converted to electrical power. Moreover, it provides such a system wherein such electrical circuit means comprises electrical network means for linking to at least one larger electrical grid. Additionally, it provides such a system wherein such electrical network means further comprises electrical controller means for controlling electrical power within such electrical network means.

Also, it provides such a system wherein such electrical controller means is structured and arranged to control electrical power flowing between such electrical network means and the at least one larger electrical grid. In addition, it provides such a system wherein: such electrical network means further comprises electrical storing means for storing electrical power; and such electrical controller means is structured and arranged to control at least one transfer of electrical power between such electrical storing means and such electrical network means. And, it provides such a system further comprising secondary heat transfer means for transferring at least one portion of the combustion heat to at least one heatable fluid. Further, it provides such a system wherein such secondary heat transfer means is structured and arranged to transfer heat to air, usable for space heating. Even further, it provides such a system wherein the heatable fluid comprises at least one liquid. Moreover, it provides such a system wherein such holding means comprises collector means for collecting of such environmentally hazardous waste oils. Additionally, it provides such a system wherein such combustion heat means comprises: atomizer means for atomizing such environmentally hazardous waste oils prior to combustion; and igniter means for igniting such environmentally hazardous waste oils after such environmentally hazardous waste oils have passed through such atomizing means.

Also, it provides such a system wherein such waste oil transfer means comprises: pump means for pumping such environmentally hazardous waste oils from such holding means to such combustion heat means; flow volume regulator means for regulating the flow volume of such environmentally hazardous waste oils pumped from such holding means to such combustion heat means; and pre-heater means for preheating such environmentally hazardous waste oils prior to burning.

In accordance with another preferred embodiment hereof, this invention provides an electrical generation system comprising: at least one electrical circuit structured and arranged to utilize electrical power; connected to such at least one electrical circuit, at least one Stirling-cycle engine structured and arranged to use the mechanical output of at least one Stirling cycle to produce electrical power; at least one holder structured and arranged to hold environmentally hazardous waste oils; at least one combustion heater structured and arranged to produce combustion heat by burning such environmentally hazardous waste oils; at least one waste oil transfer component structured and arranged to transfer such environmentally hazardous waste oils from such at least one holder to such at least one combustion heater; and at least one primary heat exchanger structured and arranged to transfer such combustion heat to such at least one Stirling-cycle engine; wherein such at least one primary heat exchanger is in operational communication with such at least one combustion heater; and wherein such environmentally hazardous waste oils may be converted to electrical power. In addition, it provides such a system wherein such at least one electrical circuit comprises at least one electrical network to at least one larger electrical grid. And, it provides such a system wherein such at least one electrical network further comprises at least one electrical controller structured and arranged to control electrical power within such at least one electrical network. Further, it provides such a system wherein such at least one electrical controller is structured and arranged to control electrical power flowing between such at least one electrical network and the at least one larger electrical grid.

Even further, it provides such a system wherein: such at least one electrical network further comprises at least one electrical storage device structured and arranged to store electrical power; and such at least one electrical controller is structured and arranged to control at least one transfer of electrical power between such at least one electrical storage device and such at least electrical network. Moreover, it provides such a system further comprising at least one secondary heat exchanger structured and arranged to transfer at least one portion of the combustion heat to at least one heatable fluid. Additionally, it provides such a system wherein such at least one secondary heat exchanger is structured and arranged to transfer heat to air, usable for space heating. Also, it provides such a system wherein the heatable fluid comprises at least one liquid. In addition, it provides such a system wherein such at least one holder comprises at least one collector structured and arranged to assist in collecting such environmentally hazardous waste oils. And, it provides such a system wherein such at least one combustion heater comprises: at least one atomizer structured and arranged to atomize such environmentally hazardous waste oils prior to combustion; and at least one igniter adapted to ignite such environmentally hazardous waste oils after such environmentally hazardous waste oils have passed through such at least one atomizer.

Further, it provides such a system wherein: such combustion heat produced by such at least one combustion heater comprises at least one directed heat flow; at least one portion of such at least one primary heat exchanger is positioned to be in thermal communication with such at least one directed heat flow; and such at least one primary heat exchanger is structured and arranged to direct at least one portion of such at least one directed heat flow to such at least one secondary heat exchanger. Even further, it provides such a system wherein such at least one waste oil transfer component comprises: at least one pump to pump such environmentally hazardous waste oils from such at least one holder to such at least one combustion heater; at least one flow volume regulator adapted to regulate the flow volume of such environmentally hazardous waste oils pumped from such at least one holder to such at least one combustion heater; and at least one pre-heater structured and arranged to preheat such environmentally hazardous waste oils prior to burning. Even further, it provides such a system further comprising: at least one power producing site having at least one such electrical circuit, and at least one operation to generate such environmentally hazardous waste oils; wherein the at least one operation is performed within the power producing site; wherein at least one such electrical circuit generates electrical power and at least one useful form of usable energy selected from the group consisting of: heated air, heated liquid, wherein such at least one combustion heater has a maximum capacity of not more than 0.5 million BTU input per hour; and wherein combustion gasses produced by the combustion of such environmentally hazardous waste oils is vented to the outside air. Even further, it provides such a system wherein the at least one operation comprises collection of the waste oil from at least one non-commercial source.

In accordance with another preferred embodiment hereof, this invention provides a method for economically disposing of waste oil comprising the steps of: collecting environmentally hazardous waste oils; combusting such environmentally hazardous waste oils to produce usable heat energy; and using such usable heat energy to power at least one Stirling-cycle engine; using the output from such Stirling-cycle engine to generate useful electrical power. Even further, it provides such a method further comprising using surplus usable heat energy from combusting such environmentally hazardous waste oils for on-site heating uses. Even further, it provides such a method further comprising the initial step of collecting such environmentally hazardous waste oils from at least one off-site, non-commercial, waste oil source. Even further, it provides such a method further comprising the step of selling at least one portion of such useful electrical power using at least one electrical grid connection.

DETAILED DESCRIPTION OF A PREFERRED EMBODIMENT OF THE INVENTION

Stirling-cycle engines were originally patented in 1816 and were commonly used prior to World War I. Stirling-cycle technology quickly became a popular alternative to steam engines due, in part, to a better operational safety record (early Stirling engines commonly used air as the working fluid). As steam engine technology improved, the Stirling engine eventually lost favor. Recent interest in distributed energy generation has revived interest in Stirling engines and, as a result, research and development efforts have increased.

The theoretical and practical design of the Stirling-cycle engine is known in the art, and therefore, will not be discussed at length within this disclosure. It is noted that the design and operation of such Stirling-cycle devices is described in greater detail in, for example, the dissertation entitled, "Stirling Cycle Engine Analysis", by Dr. Israel Urieli of Ohio University (1884), incorporated herein by reference as prior art enabling, in conjunction with this specification, the below described Stirling-cycle engines.

Stirling engines are classed as external combustion engines, comprising a sealed system utilizing an inert internal working fluid (typically a gas, such as helium), in conjunction with an external heat source and heat exchanger. Stirling-cycle engines take advantage of the relationship between heat, volume and pressure of a gas to produce mechanical power.

Figure 1:
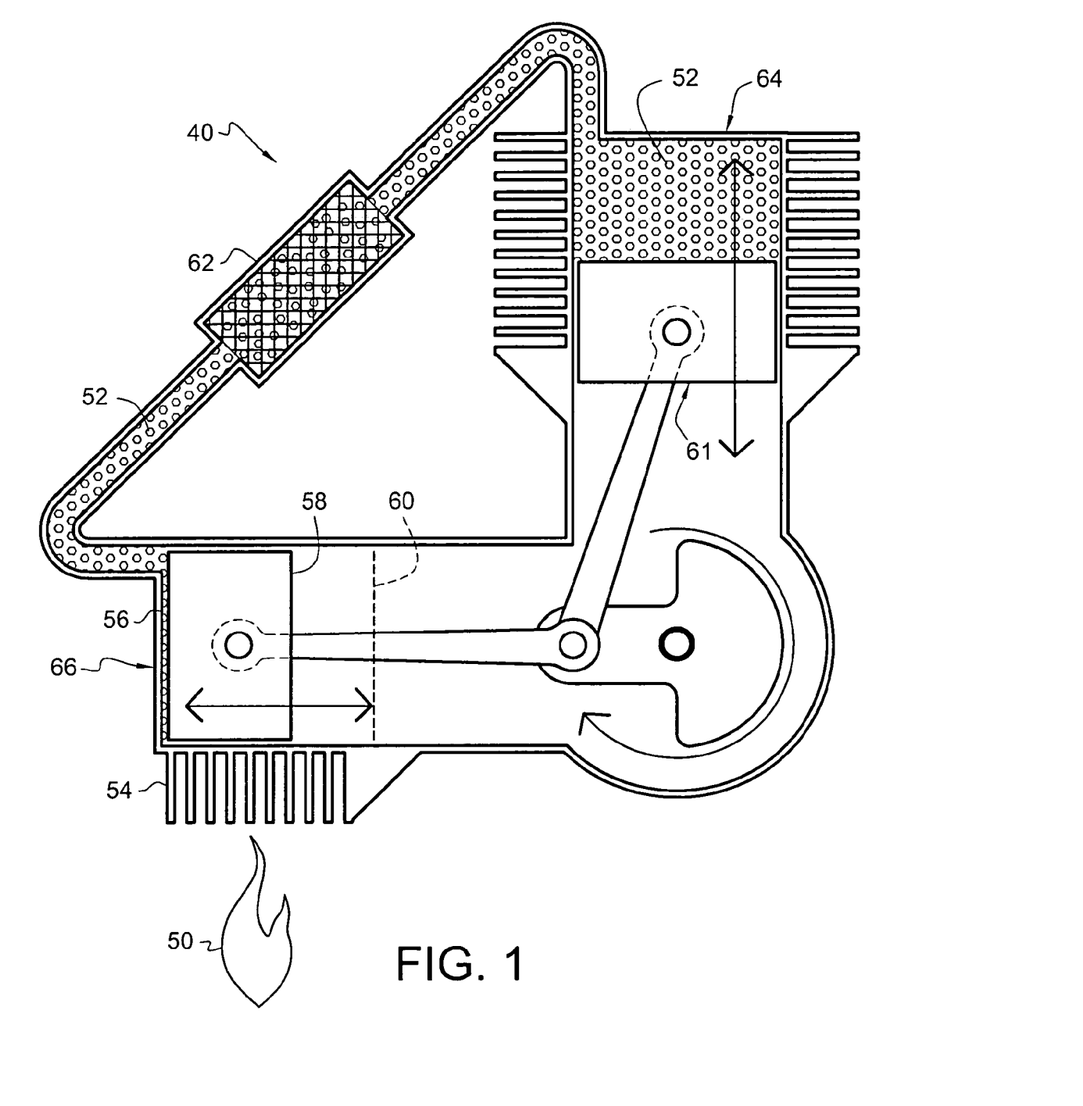
FIG. 1 is a diagrammatic sectional view, illustrating in general, the operational principles of a typical Stirling-cycle system.

Referring now to FIG. 1, in typical Stirling-cycle engine 40, heat 50 is transferred to working gas 52 through heat exchanger 54. Pressure of working gas 52 rises with the increased gas temperature as working gas 52 is held within the fixed volume of sealed cylinder 56. This increase in the pressure of working gas 52 pushes piston 58 to perform mechanical work. As piston 58 reaches a position of maximum cylinder volume 60, mechanical displacement mechanism 61 moves working gas 52 from the above-described "hot" portion of the engine 66 through "regenerator" 62 to a "cool" portion of the engine 64. In moving through regenerator 62, heat from working gas 52 is temporarily stored. Mechanical displacement mechanism 61 continues to move the cooled working gas 52 through the cycle in such a way as to move and compress cooled working gas 52 back to hot portion of the engine 66 through regenerator 62 (where it picks up the heat left behind within the regenerator matrix). Working gas 52 is further heated in heat exchanger 54 and the cycle begins again. Currently, no Stirling-cycle engine operates on the combustion heat produced by the burning of waste oil.

It is clear from the above discussions that an effective, efficient combination of a Stirling-cycle engine and waste oil burner would be of great economic and environmental benefit. With such combination, a significant portion of the "waste heat" lost in existing waste oil burner designs can be effectively recovered by a Stirling-cycle engine, thereby greatly increasing the overall energy efficiency of the combined system.

It has been determined that waste oil possesses nearly twice the energy value of coal, and more energy than #2 fuel oil. It should be noted that the term "environmentally hazardous waste oils", as used within this specification and the below claims, shall include within the definition those oils classified by the governing agencies as "recyclable" for energy recovery through burning. The applicant has estimated that using such combined used-oil-fired Stirling-cycle engine, one gallon of used oil can generate up to 18-kilowatt hours of electricity.

Operators of an on-site waste-oil-fired electrical generation system may find further economic benefits by selling surplus power back to an electrical utility, via an avoided rate, or net metering program. Additionally, off-grid operators of an on-site waste-oil-fired electrical generation system will benefit from a convenient, packaged source of electrical power, space heat and hot water.

Thus it is therefore a further object and feature of the present invention to provide such a system that converts the combustion energy of waste oil into mechanical energy by use of a Stirling-cycle engine. Thus, it is an additional object and feature of the present invention to provide such a system that utilizes the mechanical output of the Stirling-cycle engine to drive an electrical generator.

Figure 2:
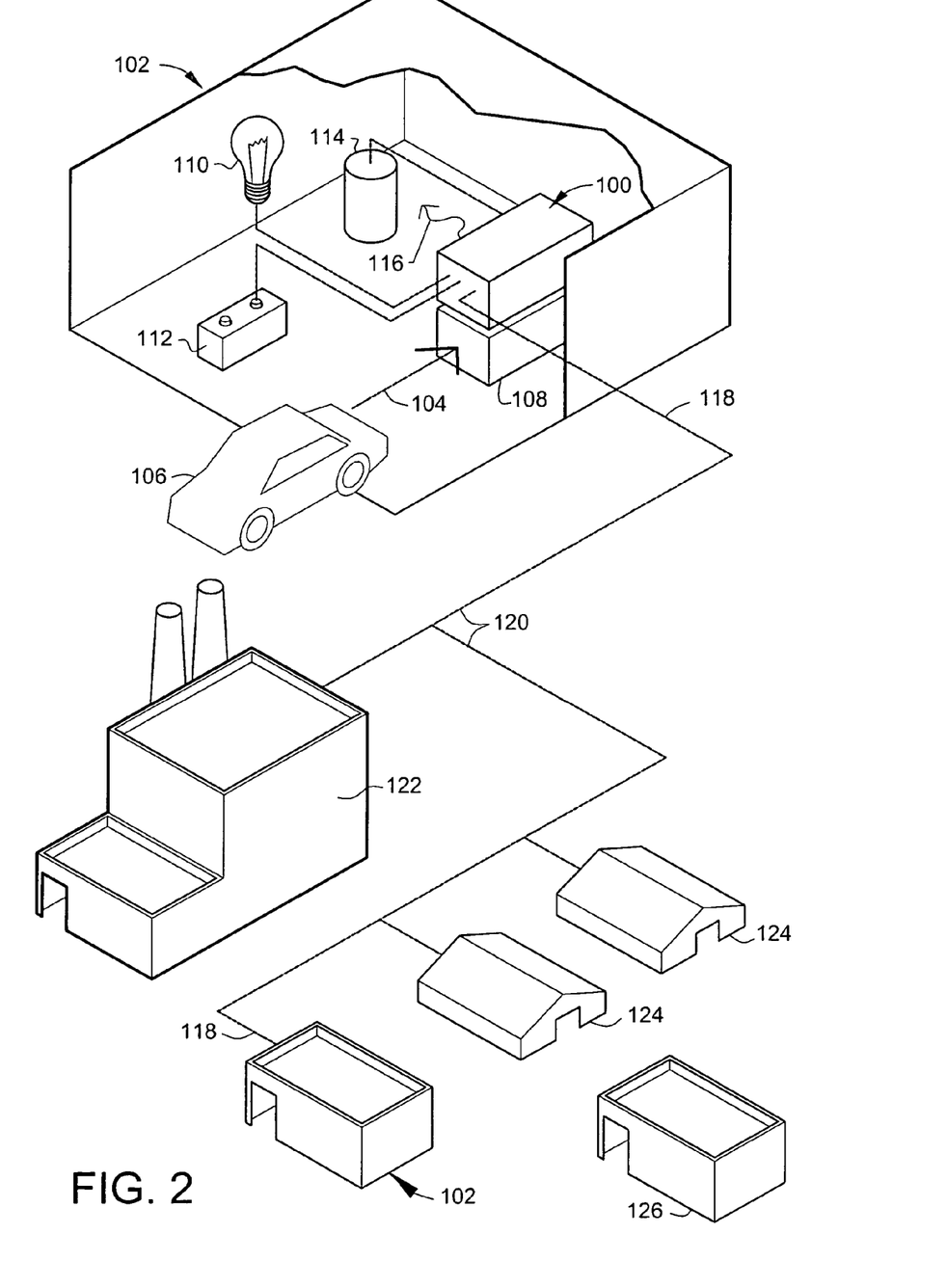
FIG. 2 is a diagrammatic perspective view, illustrating in general, a typical organization of waste oil distributed cogeneration sites linked to a larger electrical power grid, as well as remote waste oil electrical generation sites independent from a larger power distribution system, according to a preferred embodiment of the present invention.

Referring again to the drawings, FIG. 2 is a diagrammatic perspective view, illustrating in general, a typical organization of waste oil distributed cogeneration site(s) 102 linked to a larger electrical power grid 120, as well as remote waste oil electrical cogeneration site(s) 126, independent from a larger power distribution system, according to a preferred embodiment of the present invention.

The enlarged cut-away view of distributed cogeneration site 102 (in the upper portion of FIG. 2) illustrates, in general, the preferred operational and mechanical assemblies that make up a waste oil distributed cogeneration site. Preferably, a significant portion of the on-site electrical power 110 used within the local electrical network of distributed cogeneration site 102 (embodying herein electrical network means for utilizing electrical power and embodying herein at least one electrical network structured and arranged to utilize electrical power) is produced by on-site waste oil cogeneration system 100 (embodying herein Stirling-cycle power means for using the mechanical output of at least one Stirling-cycle to produce electrical power), as shown. Waste oil cogeneration system 100 is especially well-suited for use within sites that regularly generate waste oil, such as motor vehicle service shops, fleet maintenance facilities, "quick-lube" shops, and other operations that service, repair or dispose of materials that contain quantities of synthetic or refined crude oil (embodying herein a power-producing site having at least one such electrical generation system, and at least one operation to generate such environmentally hazardous waste oils; wherein the at least one operation is performed within the power producing site). Under appropriate circumstances, a distributed cogeneration site may collect waste from external, non-commercial sources, such as individuals undertaking "do-it-yourself" vehicle maintenance (embodying herein the initial step of collecting such environmentally hazardous waste oils from at least one off-site, non-commercial, waste oil source). For the purpose of illustration within the present disclosure, distributed cogeneration site 102 of FIG. 2 produces waste oil through the service and maintenance of motor vehicles 106, as shown. Waste oil 104 collected from the service and maintenance of motor vehicle 106 is preferably transferred to a waste oil collection tank 108 (embodying herein holding means for holding environmentally hazardous waste oils and further embodying herein at least one holder structured and arranged to hold environmentally hazardous waste oils), preferably incorporated within waste oil cogeneration system 100, as shown. Preferably, waste oil 104 is burned, in controlled manner, within waste oil cogeneration system 100 to produce usable heat energy.

Preferably, the term "cogeneration" refers to the simultaneous production of usable heat and on-site electrical power 110. In a preferred embodiment of the present invention, waste oil cogeneration system 100 is configured as a multi-generation unit, producing electrical power, hot air 116 (for space-heating) and hot water 114 (embodying herein wherein the heatable fluid comprises at least one liquid, and embodying herein wherein at least one such electrical generation system generates electrical power and at least one useful form of usable energy selected from the group consisting of heated air, heated liquid), as shown.

Distributed cogeneration site 102 may preferably include an energy storage system 112 to permit added flexibility in the timing and frequency of external electrical power purchases and increased reliability to the overall electrical supply features of the system. To control initial implementation and long-term maintenance costs, energy storage system 112 preferably comprises a conventional battery storage system, as shown (embodying herein wherein such electrical network means further comprises electrical storing means for storing electrical power and further herein embodying wherein such at least one electrical network further comprises at least one electrical storage device structured and arranged to store electrical power). Upon reading this specification, those with ordinary skill in the art will understand that, under appropriate circumstances, such as commercial availability, user preference, advances in technology, etc., other storage systems, such as, for example, super capacitors, Superconducting Magnetic Energy Storage (SMES) systems, flywheels and Compressed Air Energy Storage (CAES) systems, may suffice.

Preferably, distributed cogeneration site(s) 102 located near or within an external electrical power distribution system, such as larger electrical power grid 120, include at least one electrical grid connection 118 (herein embodying wherein such electrical network means comprises at least one electrical link to at least one larger electrical grid, and embodying herein wherein such at least one electrical network comprises at least one electrical link to at least one larger electrical grid), as shown. Preferably, distributed cogeneration site 102 supplies any excess electrical power generated by waste oil cogeneration system 100 to larger electrical power grid 120, via electrical grid connection 118, as shown. Similarly, electrical grid connection 118 allows distributed cogeneration site 102 to draw electrical power from central generating plant 122, via larger electrical power grid 120, in circumstances where the overall power demand of distributed cogeneration site 102 exceeds the generation capacity of waste oil cogeneration system 100. The term "distributed cogeneration", as described within the present disclosure, refers to a decentralization of electrical power generation from traditional large "utility" scale generation sites (such as central generating plant 122) to a combination of conventional large scale generation sites functioning in conjunction with a "near-demand" distribution of smaller, "on-site" electrical generators, as shown. While central generating plant 122 continues to provide most of the power to larger electrical power grid 120, the distributed cogeneration site(s) 102 are, under appropriate circumstances, able to supply power to other local power users during times of peak demand, as shown.

In another highly-preferred application of the present invention, waste oil cogeneration system 100 is used to supply electrical power and usable heat energy to remote waste oil electrical cogeneration site 126, as shown. Waste oil electrical cogeneration site 126 is located such that connection to larger electrical power grid 120 is impossible or otherwise impractical. In the case of remote waste oil electrical cogeneration site 126, waste oil cogeneration system 100 preferably supplies all electrical power and at least some mechanical heating to the site.

Figure 3:
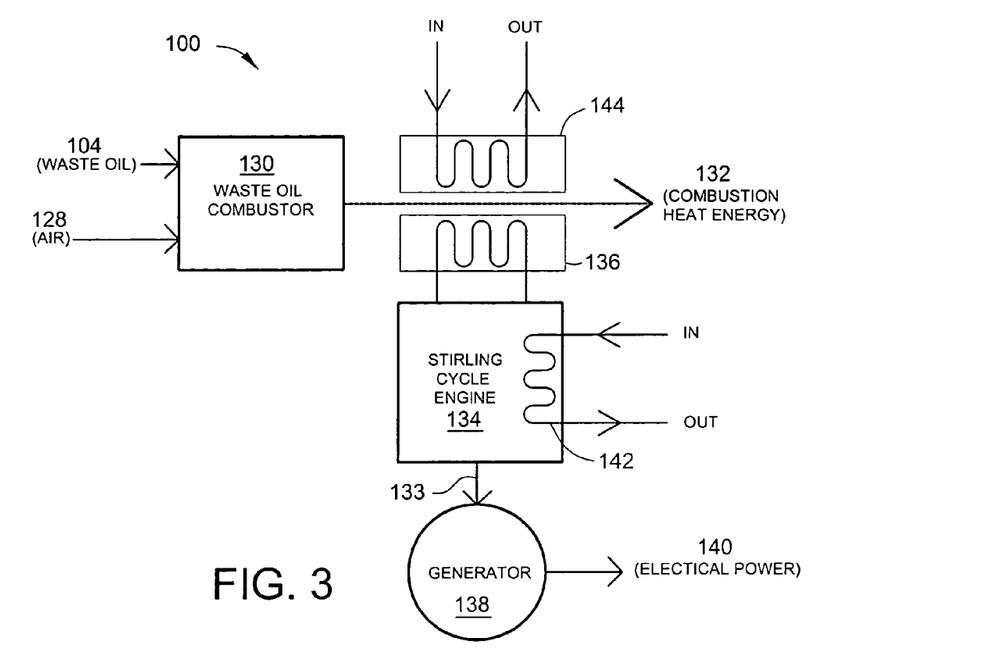
FIG. 3 is a diagrammatic illustration of the principal components of the waste oil cogeneration system according to the preferred embodiment of FIG. 2.

FIG. 3 is a diagrammatic illustration of the principal components of waste oil cogeneration system 100, according to the preferred embodiment of FIG. 2. Preferably, waste oil cogeneration system 100 contains at least one waste oil combustor 130 (embodying herein combustion heat means for producing combustion heat by burning such environmentally hazardous waste oils and embodying herein at least one combustion heater structured and arranged to produce combustion heat by burning such environmentally hazardous waste oils) that combines oil 104 with compressed air 128 to form a highly combustible air/fuel mixture. Igniting the mixture of waste oil 104 and compressed air 128 generates combustion heat energy 132, as shown.

A primary function of waste oil electrical cogeneration system 100 is the conversion of combustion heat energy 132 into electrical power 140, as shown. The conversion of combustion heat energy 132 into electrical power is accomplished through a basic multi-step process. Preferably, working fluid heat exchanger 136 (embodying primary heat transfer means for transferring of such combustion heat to such Stirling-cycle means) is brought into thermal relationship with combustion heat energy 132 (herein embodying wherein such primary heat transfer means is in operational communication with such combustion heat means, and further embodying herein at least one primary heat exchanger structured and arranged to transfer such combustion heat to such at least one Stirling-cycle engine), initiating the transfer of heat from combustion heat energy 132 to Stirling-cycle engine 134, as shown. Preferably, Stirling-cycle engine 134 is arranged to convert the heat transferred by working fluid heat exchanger 136 into mechanical energy 133 (e.g., torque within a rotating output shaft), as shown. Preferably, Stirling-cycle engine 134 is operationally coupled to electrical generator 138, which then converts mechanical energy 133 into electrical power 140 (embodying herein at least one Stirling-cycle engine structured and arranged to use the mechanical output of at least one Stirling cycle to produce electrical power).

As previously described, waste oil electrical cogeneration system 100 is preferably a cogeneration (or multi-generation) unit wherein secondary energy, in the form of usable heat, is derived from the system. In the example of FIG. 3, secondary fluid heat exchanger 144 (embodying herein secondary heat transfer means for transferring at least one portion of the combustion heat to at least one heatable fluid, and further embodying herein at least one secondary heat exchanger structured and arranged to transfer at least one portion of the combustion heat to at least one heatable fluid) is brought into thermal relationship with combustion heat energy 132, drawing usable heat from combustion heat energy 132, as shown.

Figure 4:
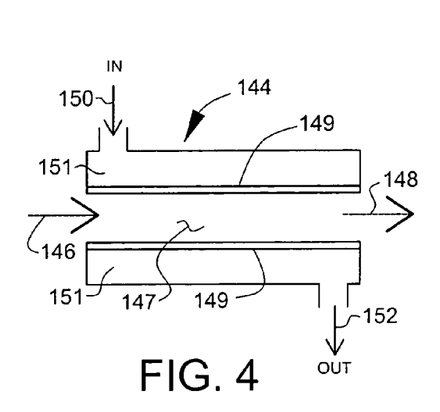
FIG. 4 is a diagrammatic illustration of the secondary fluid heat exchanger according to the preferred embodiment of FIG. 3.

FIG. 4 is a diagrammatic illustration of secondary fluid heat exchanger 144, according to the preferred embodiment of FIG. 3. In the highly simplified model of FIG. 4, secondary fluid heat exchanger 144 comprises two approximately concentric pipes, each pipe having an input and output. Preferably, incoming combustion heat 146 is introduced into and moves through combustion chamber 147 before exiting as outgoing combustion heat 148, as shown. Similarly, a lower temperature incoming secondary fluid 150 is introduced into secondary fluid channel 151, where it moves around combustion chamber 147 before exiting as outgoing secondary fluid 152, as shown. As incoming secondary fluid passes around combustion chamber 147, heat energy is transferred from incoming combustion heat 146 to the lower temperature incoming secondary fluid 150, across secondary heat exchanger wall 149, thereby raising the temperature of incoming secondary fluid 150. In practical application, the efficiency of heat-energy transfer across secondary heat exchanger wall 149 can never achieve one-hundred percent. Due to factors such as transfer surface area and material heat-transfer rates, a significant percentage of the heat energy of incoming combustion heat 146 will remain in outgoing combustion heat 148, discharged from the system as waste exhaust. Oil combustion burner systems for space heating may discharge as much as seventy percent of outgoing combustion heat 148 as waste exhaust.

Figure 5:
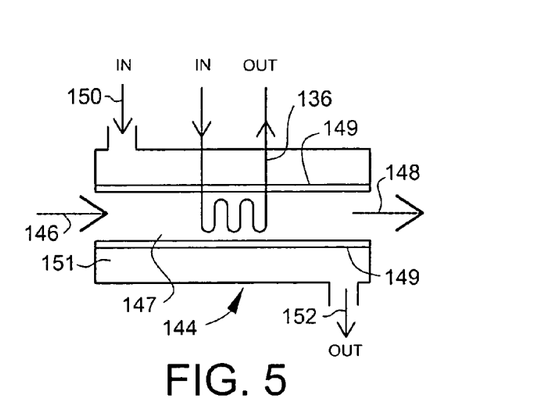
FIG. 5 is a diagrammatic illustration of the secondary fluid heat exchanger showing the working fluid heat exchanger introduced into the combustion chamber according to the preferred embodiment of FIG. 3.

FIG. 5 is a diagrammatic illustration of secondary fluid heat exchanger 144, showing working fluid heat exchanger 136 introduced into combustion chamber 147, according to the preferred embodiment of FIG. 3. By placing working fluid heat exchanger 136 into combustion chamber 147, waste oil electrical cogeneration system 100 effectively captures and utilizes heat energy of outgoing combustion heat 148 that is normally lost as waste exhaust, as shown. It should be noted that the introduction of working fluid heat exchanger 136 into combustion chamber 147 has no significant impact on the quantity or rate of heat energy transfer from incoming combustion heat 146 to incoming secondary fluid 150 across secondary heat exchanger wall 149.

Figure 6:
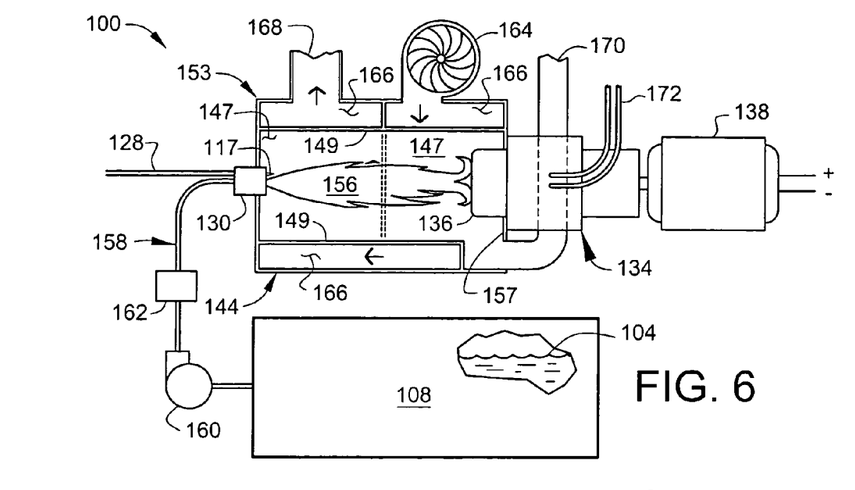
FIG. 6 is a diagrammatic configuration view of a waste oil cogeneration system according to a preferred embodiment of the present invention.

FIG. 6 is a diagrammatic sectional view of waste oil cogeneration system 100, according to a preferred embodiment of the present invention. Preferably, waste oil electrical cogeneration system 100 is an assembly comprised of waste-oil-fired hot air furnace 153, modified to receive Stirling-cycle engine 134 and electrical generator 138, as shown. Preferably, waste-oil-fired hot air furnace 153 is a commercially available unit, for example, waste-oil-fired hot air furnaces produced by Clean Burn, Inc. of Leola, Pa., U.S.A. Waste oil burning devices of this type are also known by those skilled in the art as "multi-oil furnaces", and typically include a number of specific features to allow for efficient combustion of multiple waste oil types having varying physical properties.

In a typical arrangement, waste oil 104 is preferably held in waste oil collection tank 108 of waste oil electrical cogeneration system 100 prior to being transferred to waste oil combustor 130, via waste oil transfer assembly 158 (embodying herein waste oil transfer means for transferring such environmentally hazardous waste oils from such holding means to such combustion heat means and herein embodying at least one waste oil transfer component structured and arranged to transfer such environmentally hazardous waste oils from such at least one holder to such at least one combustion heater), as shown. Preferably, waste oil transfer assembly 158 includes waste oil pump 160 (embodying herein pump means for pumping such environmentally hazardous waste oils from such holding means to such combustion heat means, and further embodying herein at least one pump structured and arranged to pump such environmentally hazardous waste oils from such at least one holder to such at least one combustion heater), as shown. Typically, waste oil 104 is pre-conditioned before reaching waste oil combustor 130 by passing through waste oil volume/viscosity control 162, as shown. Pre-conditioning provided by waste oil volume/viscosity control 162 typically includes such actions as flow rate sampling, control of waste oil transfer rate and pre-heating of waste oil 104 to assist in managing oil viscosity for optimal combustion conditions within combustion chamber 147, as shown (embodying herein flow volume regulator means for regulating the flow volume of such environmentally hazardous waste oils pumped from such holding means to such combustion heat means; and pre-heater means for preheating such environmentally hazardous waste oils prior to burning, and further embodying herein at least one flow volume regulator structured and arranged to regulate the flow volume of such environmentally hazardous waste oils pumped from such at least one holder to such at least one combustion heater; and at least one pre-heater structured and arranged to preheat such environmentally hazardous waste oils prior to burning). It is noted that the configuration and operation of such waste oil pre-conditioning devices is described in greater detail in, for example, U.S. Pat. No. 5,551,868 to Smoker et al., incorporated herein by reference for further examples of implementation engineering. Preferably, waste oil combustor 130 is a highly efficient design, comprising at least one burner nozzle that combines a flow of compressed air 128 with a flow of pre-heated waste oil 104 (embodying herein atomizer means for atomizing such environmentally hazardous waste oils prior to combustion, and embodying herein at least one atomizer structured and arranged to atomize such environmentally hazardous waste oils prior to combustion). Preferably, the mixture of compressed air 128 and waste oil 104 is injected into combustion chamber 147, where ignition assembly 117 (embodying herein igniter means for igniting such environmentally hazardous waste oils after such environmentally hazardous waste oils have passed through such atomizing means, and further embodying herein at least one igniter structured and arranged to ignite such environmentally hazardous waste oils after such environmentally hazardous waste oils have passed through such at least one atomizer) ignites the atomized mixture generating a focused combustion flame 156 directed to the interior of combustion chamber 147 (see also FIG. 10). It is noted that the configuration and operation of waste oil combustors (such as waste oil combustor 130) is described in greater detail in, for example, U.S. Pat. No. 6,048,197 to Beiler, incorporated herein by reference for further examples of implementation engineering. Commercially-available waste oil combustors of the type preferably used in the present invention may be supplied with an approximate thermal output ranging from about 100,000 BTUs/hr to over 500,000 BTUs/hr at temperatures of up to about 2,000 degrees Fahrenheit (embodying herein wherein such at least one combustion heater has a maximum capacity of not more than 0.5 million BTU input per hour).

Preferably, secondary fluid heat exchanger 144 of waste-oil-fired hot air furnace 153 comprises at least one combustion chamber 147 surrounded on all sides by heat exchanger air channel 166, as shown. Preferably, air intake fan 164 moves the secondary fluid (comprising air in the present embodiment) through heat exchanger air channel 166, where it is heated before passing out of heat exchanger air channel 166 by means of hot air discharge 168, as shown. The heated air exiting hot air discharge 168 is preferably used to provide local space heating (embodying herein wherein such secondary heat transfer means is structured and arranged to transfer heat to air usable for space heating, and further embodying herein wherein such at least one secondary heat exchanger is structured and arranged to transfer heat to air usable for space heating) within the waste oil electrical cogeneration system site (as previously described in FIG. 2). Preferably, combustion chamber 147 includes combustion gas discharge flue 170 to remove spent combustion gases from the system, as shown (embodying herein wherein combustion gasses produced by the combustion of such environmentally hazardous waste oils is vented to the outside air). It is noted that the configuration and operation of such a secondary fluid heat exchanger is described in greater detail in, for example, U.S. Pat. No. 5,531,212 to Smoker et al., incorporated herein by reference for further examples of implementation engineering.

Applicant prefers that, in applicant's waste-oil-fired hot air furnace 153, working fluid heat exchanger 136 is introduced into combustion chamber 147 through back wall 157 (as apposed to Smoker et al., for example), thereby permitting a portion of the heat energy from the directed combustion flame 156 (herein embodying at least one directed heat flow) to be transferred to Stirling-cycle engine 134, as shown. Preferably, the configuration of working fluid heat exchanger 136 is such that combustion flame 156 is directed back in combustion chamber 147, thereby maintaining the overall efficiency of the combustion and secondary heat transfer process, as shown (herein embodying wherein such combustion heat produced by such at least one combustion heater comprises at least one directed heat flow; at least one portion of such at least one primary heat exchanger is positioned to be in thermal communication with such at least one directed heat flow; and such at least one primary heat exchanger is structured and arranged to direct at least one portion of such at least one directed heat flow to such at least one secondary heat exchanger). Upon reading this specification, those with ordinary skill in the art will understand that, under appropriate circumstances, such as, to accommodate specific furnace thermal performance characteristics, user preference, advances in technology, etc., other positions of the working fluid heat exchanger within the combustion chamber, such as, for example, non-concentric, front mounted, etc., may suffice.

Preferably, Stirling-cycle engine 134 comprises a 480 cc four-piston alpha configuration, such as Model STM 4-120 produced by Stirling Thermal Motors, Inc. of Ann Arbor, Mich., U.S.A. Using a waste oil burner having a combustion flame temperature of approximately 1,400 degrees Fahrenheit (as measured at working fluid heat exchanger 136), Stirling-cycle engine 134 typically produces about 40 hp at an average shaft speed of about 1800 rpm. Preferably, Stirling-cycle engine 134 is coupled to an "off-the-shelf" induction-type electrical generator 138, preferably having a rated electrical output (after inverter processing) of 25 kW at 480 VAC/3-phase at 60 Hz. Further, Stirling-cycle engine 134 typically produces up to 150,000 BTUs/Hr of hot water from the engine's internal coolant circuit, delivered by means of Stirling engine coolant lines 172, as shown.

Figure 7:
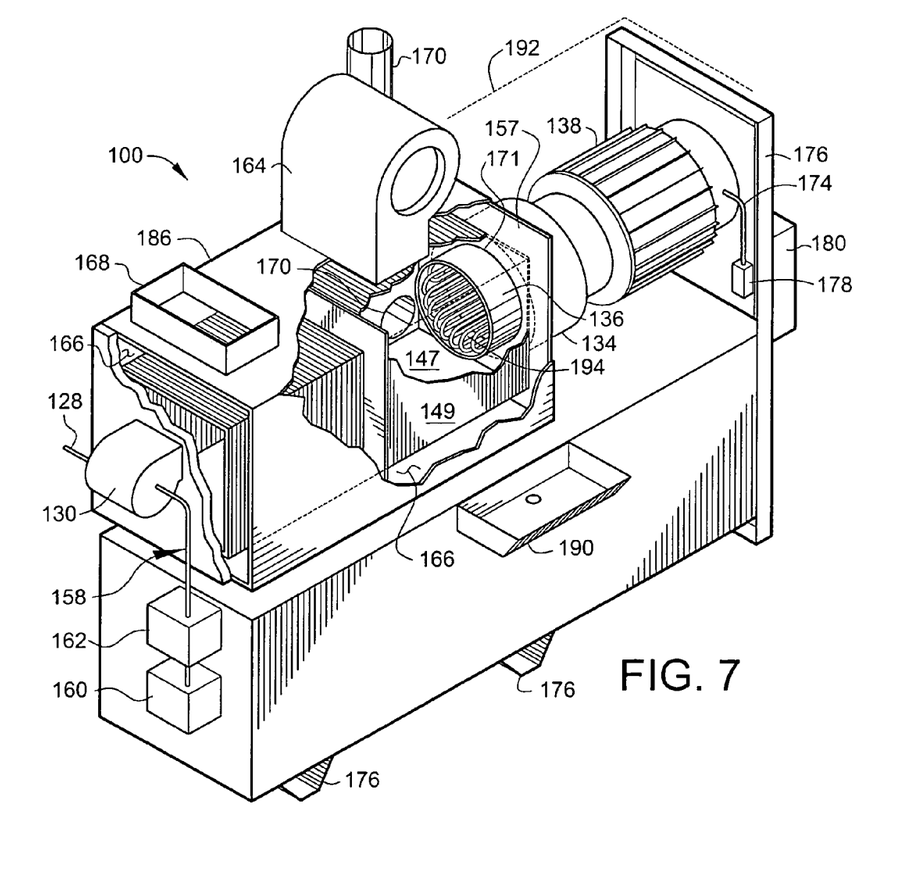
FIG. 7 is a perspective view, in partial section, of the waste oil cogeneration system of the preferred embodiment of FIG. 6.

FIG. 7 is a perspective view, in partial section, of the waste oil cogeneration system 100, according to the preferred embodiment of FIG. 6. The cut-away view of FIG. 7 more clearly shows the preferred arrangement of working fluid heat exchanger 136 within combustion chamber 147. Modifications to Stirling-cycle engine 134 required to permit the engine to be incorporated into waste oil cogeneration system 100 are clearly within the abilities of those skilled in the art in light of the present teachings, preferably limited to removal of the factory burner assembly. Preferably, back wall 157 of combustion chamber 147 is prepared to receive Stirling-cycle engine 134, by cutting heat exchange aperture 171 through back wall 157, and by further locating and drilling appropriately-sized mounting holes matching the standard mounting holes of the Stirling-cycle engine factory burner assembly. Upon reading this specification, those with ordinary skill in the art will understand that, under appropriate circumstances, such as heavy duty applications, specific furnace/engine combinations, etc., other assemblies, such as, for example, additional plate adapters and/or reinforcing added to back wall 157 to further anchor and support Stirling-cycle engine 134, may suffice. Preferably, working fluid transfer lines 194 of working fluid heat exchanger 136 are oriented to be in direct contact with the focus of combustion flame 156, as shown. Upon reading this specification, those with ordinary skill in the art will understand that, under appropriate circumstances, such as to enhance the performance of the heat transfer processes within the waste oil cogeneration system, the use of other heat-retaining, heat-blocking and heat-directing elements, such as, for example, ceramic shapes, heat-resistant deflectors, etc., may be used at various positions within the combustion chamber. For example, a metallic or ceramic heat-directing ring placed around working fluid heat exchanger 136 to control the return path of combustion flame 156, may suffice.

Preferably, the overall configuration of waste oil cogeneration system 100 comprises a self-contained unit having an internal system support structure 176, preferably constructed from metal, preferably steel, as shown. Preferably, all external access panels 192 are removable for servicing and inspection, as shown. Preferably, collection tank 108 includes one or more waste oil collection assemblies 190 to assist in the collection and storage of waste oil 104, as shown (embodying herein wherein such holding means comprises collector means for collecting of such environmentally hazardous waste oils and further embodying herein wherein such at least one holder comprises at least one collector structured and arranged to assist in collecting such environmentally hazardous waste oils). Upon reading this specification, those with ordinary skill in the art will understand that, under appropriate circumstances, such as to address issues of user preference, advances in technology, etc., other locations for the waste oil collection point, such as, for example, exterior collection assemblies, remote collection areas, etc., may suffice.

Electrical power assemblies 178 preferably route power from electrical generator 138 to electrical power controls 180 mounted on or near waste oil cogeneration system 100, as shown. Preferably, electrical power controls 180 include such devices as: safety breakers, power disconnects, power monitors and controllers, charge controllers for a battery storage system (embodying herein wherein such electrical controller means is structured and arranged to control at least one transfer of electrical power between such electrical storing means and such electrical network means) and power inverters, including trace PS and SW series inverters for utility grid connection capability (embodying herein wherein such electrical network means further comprises electrical controller means for controlling electrical power within such electrical network means and wherein such electrical controller means is structured and arranged to control electrical power flowing between such electrical network means and the at least one larger electrical grid and further embodying herein wherein such at least one electrical network further comprises at least one electrical controller structured and arranged to control electrical power within such at least one electrical network, and wherein such at least one electrical controller is structured and arranged to control electrical power flowing between such at least one electrical network and the at least one larger electrical grid), thereby permitting the sale of surplus-generated power back to the utility through net metering or similar programs (embodying herein using surplus usable heat energy from combusting such environmentally hazardous waste oils for on-site heating uses). Further, those of ordinary skill in the art will, upon reading this specification understand that, under appropriate circumstances, electrical power controls 180 may include internal power metering to allow, for example, the manufacturer of waste oil cogeneration system 100 to place units within a waste oil cogeneration site on a cost partnership basis (where all or a pre-arranged portion of the electrical power generated by waste oil cogeneration system 100 is sold by the manufacturer to the co-generating site, at a grid competitive or pre-arranged rate). The above-described preferred arrangement herein embodies: collecting environmentally hazardous waste oils; combusting such environmentally hazardous waste oils to produce usable heat energy; using such usable heat energy to power at least one Stirling-cycle engine; using the output from such Stirling-cycle engine to generate useful electrical power; and selling at least one portion of such useful electrical power by way of at least one electrical grid connection.

Preferably, waste oil cogeneration system 100 is scalable to larger generation applications by using the combined generating power of multiple waste oil cogeneration system (s) 100.

Figures 8, 8A:
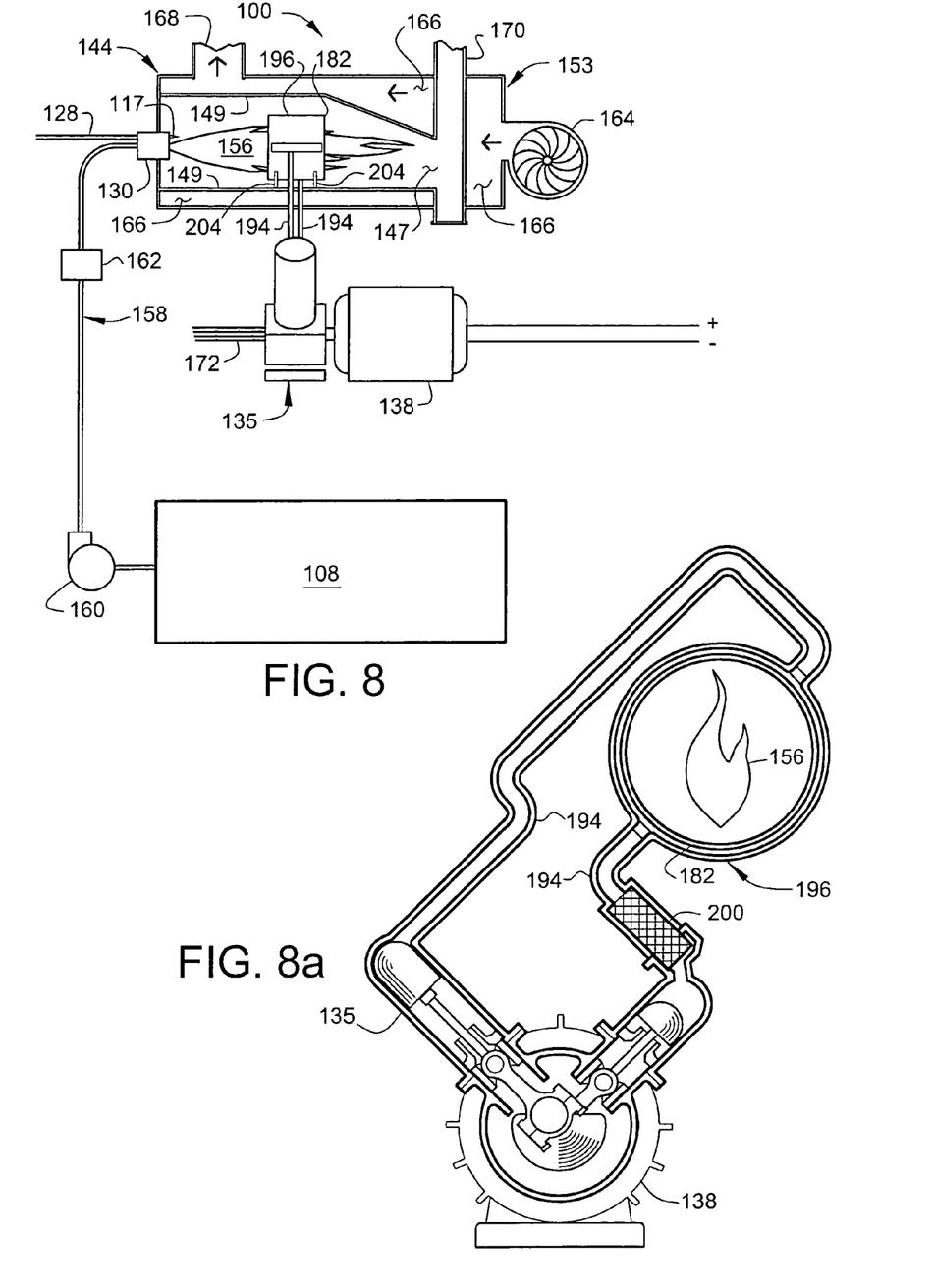
FIG. 8 is a diagrammatic sectional view of an alternate preferred waste oil cogeneration system according to an alternate preferred embodiment of the present invention.
FIG. 8a is a diagrammatic illustration, partially in section, of the torodial-shaped working fluid heat exchanger, Stirling-cycle engine, and electrical generator of the alternate preferred embodiment of FIG. 8.

FIG. 8 is a diagrammatic sectional view of an alternate preferred waste oil cogeneration system 100, according to another highly preferred embodiment of the present invention. Preferably, waste oil electrical cogeneration system 100 is an assembly comprised of waste-oil-fired hot air furnace 153 modified to receive toroidal-shaped heat exchanger 196 of Stirling-cycle engine 135, as shown. Preferably, waste-oil-fired hot air furnace 153 is a commercially available unit produced by Black Gold Corporation of Nashville, Tenn., U.S.A.

Preferably, waste oil 104 is held in waste oil collection tank 108 (of waste oil cogeneration system 100) prior to being transferred to waste oil combustor 130, via waste oil transfer assembly 158, as shown. Preferably waste oil transfer assembly 158 includes waste oil pump 160 (embodying herein pump means for pumping such environmentally hazardous waste oils from such holding means to such combustion heat means), as shown. Depending on such factors as temperature and the type of waste oil being burned, waste oil 104 may be pre-conditioned before reaching waste oil combustor 130 by passing through waste oil volume/viscosity control 162, as shown. Pre-conditioning provided by waste oil volume/viscosity control 162 may include such actions as flow rate sampling, control of waste oil transfer rate and pre-heating of waste oil 104 to assist in managing oil viscosity for optimal combustion conditions within combustion chamber 147, as shown. Preferably, waste oil combustor 130 comprises a burner nozzle that combines a flow of compressed air 128 with a flow of pre-heated waste oil 104. Preferably, the mixture of compressed air 128 and waste oil 104 is injected into combustion chamber 147, where an ignition assembly 117 ignites the atomized mixture generating combustion flame 156, as shown. It is noted that the configuration and operation of such waste oil pre-conditioning devices is described in greater detail in, for example, U.S. Pat. No. 5,879,149 to Briggs et al., incorporated herein by reference for further examples of implementation engineering.

Preferably, secondary fluid heat exchanger 144 of waste-oil-fired hot air furnace 153 comprises combustion chamber 147, surrounded on all sides by heat exchanger air channel 166, as shown. Preferably, air intake fan 164 moves the secondary fluid (in this case air) through heat exchanger air channel 166, where it is heated, before passing out of heat exchanger air channel 166 through hot air discharge 168, as shown. The heated air exiting hot air discharge 168 is again preferably used to provide local space heating within the waste oil electrical cogeneration system site (as previously described in FIG. 2). Preferably, combustion chamber 147 includes combustion gas discharge flue 170 to remove spent combustion gases from the system, as shown. It is noted that the configuration and operation of such a secondary fluid heat exchanger is described in greater detail in, for example, U.S. Pat. No. 4,955,359 to Briggs et al. and U.S. Pat. No. 5,363,836 to Briggs, incorporated herein by reference for further examples of implementation engineering.

Toroidal-shaped heat exchanger 196 is preferably coaxially positioned within the interior of combustion chamber 147, preferably along the chamber's longitudinal axis, preferably at a position equidistant from waste oil combustor 130 and combustion gas discharge flue 170, as shown. Toroidal-shaped heat exchanger 196 may be firmly positioned within combustion chamber 147 by a plurality of support members 204 anchored to secondary heat exchanger wall 149, as shown. Preferably, combustion flame 156 is directed to pass through the interior of toroidal-shaped heat exchanger 196, as shown. In the preferred embodiment of FIG. 8, working fluid transfer lines 194 provide the fluid transfer path between toroidal-shaped heat exchanger 196, and Stirling-cycle engine 135, as shown. The above-described embodiment allows Stirling-cycle engine 135 to be located outside waste-oil-fired hot air furnace 153 in a preferred arrangement, as shown. Upon reading this specification, those with ordinary skill in the art will understand that, under appropriate circumstances, such as, user preference, advances in technology, particular space/cost/use circumstances, etc., other selection of internal/external arrangements, may suffice.

As one preferred example, Stirling-cycle engine 135 comprises a 160 cc 90° V-2-cylinder unit, preferably Model V-160 produced by Solo Kleinmoteren GmbH of Sindelfingen, Germany. Using a waste oil burner having a combustion flame temperature of approximately 1,300 degrees Fahrenheit (700° C.) (as measured at working fluid heat exchanger 136), Stirling-cycle engine 135 produces about 11 kW of mechanical power at an average shaft speed of about 1500 rpm (with working fluid heat exchanger 136 maintaining an average working gas pressure of 15 Mpa). Preferably, Stirling-cycle engine 135 is coupled to an induction-type electrical generator 138, having a rated electrical output (after inverter processing) of 25 kW at 480 VAC/3-phase at 60 Hz. Further, Stirling-cycle engine 135 produces up to 150,000 BTUs/Hr of hot water from the engine's internal coolant circuit delivered through Stirling engine coolant lines 172, as shown.

FIG. 8a is a diagrammatic illustration, partially in section, of the torodial-shaped working fluid heat exchanger 196, Stirling-cycle engine 135, and electrical generator 138 of the alternate preferred embodiment of FIG. 8.

Preferably, toroidal-shaped working fluid heat exchanger 196 is formed from a tightly-coiled arrangement of heat exchange tubes 182, as shown. Preferably, heat exchange tubes 182 and working fluid transfer lines 194 each comprise ¼" diameter tubing, preferably constructed from stainless steel or heat-resistant inconel 713/625. Upon reading this specification, those with ordinary skill in the art will understand that, under appropriate circumstances, in consideration of such issues as material cost, user preference, advances in technology, etc., other working fluid transfer line configurations, such as, for example, alternate tubing diameters, heat-resistant materials, etc., may suffice.

Figure 9:
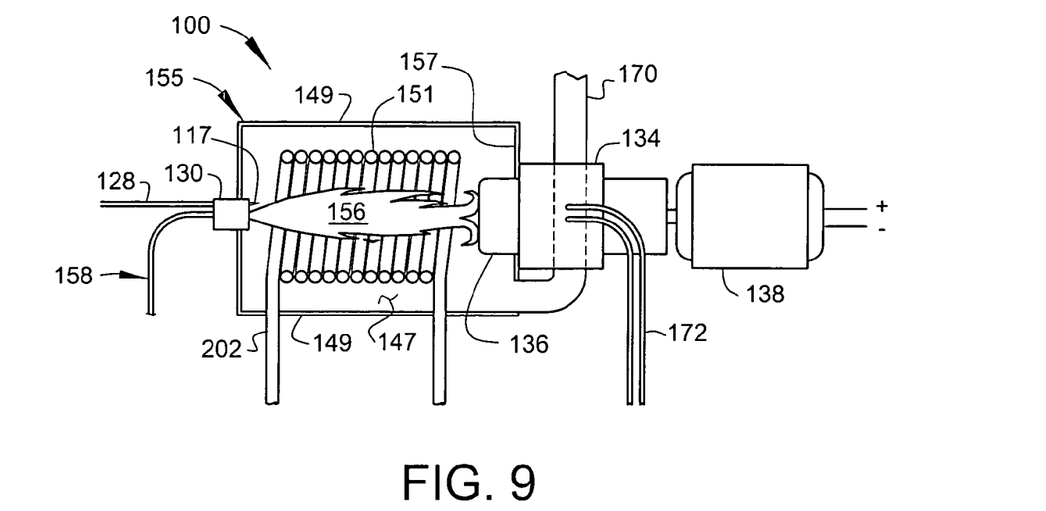
FIG. 9 is a diagrammatic sectional view of a waste oil cogeneration system according to yet another preferred embodiment of the present invention.

FIG. 9 is a diagrammatic sectional view of waste oil cogeneration system 100, according to another preferred embodiment of the present invention. Preferably, waste oil electrical cogeneration system 100 comprises a waste-oil-fired hot water boiler 155 modified to receive Stirling-cycle engine 134, as shown. As one preferred example, waste-oil-fired hot water boiler 155 may comprise a commercially-available unit produced by Clean Burn, Inc. of Leola, Pa., U.S.A.

In operation, waste oil 104 is preferably transferred to waste oil combustor 130, via waste oil transfer line 158, as shown. As in the prior embodiments of FIG. 6 and FIG. 8, waste oil combustor 130 is preferably a high-efficiency design comprising at least one burner nozzle that combines a flow of compressed air 128 with a flow of pre-heated waste oil 104 that, when ignited within combustion chamber 147, generates focused combustion flame 156, as shown. It is noted that the configuration and operation of waste oil combustors, such as waste oil combustor 130, is described in greater detail in, for example, U.S. Pat. No. 6,048,197 to Beiler, incorporated herein by reference for further examples of implementation engineering (see FIG. 10). Commercially-available waste oil combustors of the type preferably used in the present invention may be supplied with an approximate thermal output ranging from about 100,000 BTUs/hr more than 500,000 BTUs/hr at temperatures of up to about 2,000 degrees Fahrenheit, well within the operating requirements of Stirling-cycle engine 134.

Preferably, waste-oil-fired coil tube boiler 155 comprises at least one combustion chamber 147 containing coiled tube heat exchanger 202, as shown. Preferably, water pumped through coiled tube heat exchanger 202 is heated by combustion flame 156, as shown. The hot water exiting coiled tube heat exchanger 202 is preferably used to provide local domestic hot water or space heating within the waste oil electrical cogeneration system site. Preferably, combustion chamber 147 includes combustion gas discharge flue 170 to remove spent combustion gases from the system, as shown. It is noted that the configuration and operation of such a waste-oil-fired coil tube boiler is described in greater detail in, for example, U.S. Pat. No. 6,085,701 to Stauffer et al., incorporated herein by reference for further examples of implementation engineering.

In the waste oil boiler taught by Stauffer et al. (U.S. Pat. No. 6,085,701), combustion flame 156 is fired toward the back wall of combustion chamber 147. Applicant prefers that, in applicant's waste-oil-fired coil tube boiler 155, working fluid heat exchanger 136 is introduced into combustion chamber 147 through back wall 157 (as apposed to Smoker et al. and Stauffer et al., for example), thereby permitting a portion of the heat energy from combustion flame 156 to be transferred to Stirling-cycle engine 134, as shown. Preferably, the configuration of working fluid heat exchanger 136 is such that combustion flame 156 is directed back in combustion chamber 147, thereby maintaining the overall efficiency of the combustion and secondary heat transfer process, as shown (herein embodying wherein such combustion heat produced by such at least one combustion heater comprises at least one directed heat flow; at least one portion of such at least one primary heat exchanger is positioned to be in thermal communication with such at least one directed heat flow; and such at least one primary heat exchanger is structured and arranged to direct at least one portion of such at least one directed heat flow to such at least one secondary heat exchanger). Upon reading this specification, those with ordinary skill in the art will understand that, under appropriate circumstances, such as, to accommodate specific furnace thermal performance characteristics, user preference, advances in technology, etc., other positions of the working fluid heat exchanger within the combustion chamber, such as, for example, non-concentric, front mounted, etc., may suffice.

As one preferred example, Stirling-cycle engine 134 may comprise a 480 cc four-piston alpha configuration, such as Model STM 4-120 produced by Stirling Thermal Motors, Inc. Using a waste oil burner having a combustion flame temperature of approximately 1,400 degrees Fahrenheit (as measured at working fluid heat exchanger 136), Stirling-cycle engine 134 produces about 40 hp at an average shaft speed of about 1800 rpm. Preferably, Stirling-cycle engine 134 is coupled to an induction-type electrical generator 138, preferably having a rated electrical output (after inverter processing) of 25 kW at 480 VAC/3-phase at 60 Hz. Further, Stirling-cycle engine 134 preferably produces up to 150,000 BTUs/Hr of additional hot water from the engine's internal coolant circuit delivered through Stirling engine coolant lines 172, as shown.

It should be noted that, under appropriate circumstance, other Stirling-cycle engine/generator designs may be used within the above-described embodiments, for example, the Stirling engine/generator combinations produced by the Stirling Technology Company of Kennewick, Wash., U.S.A.

Figure 10:
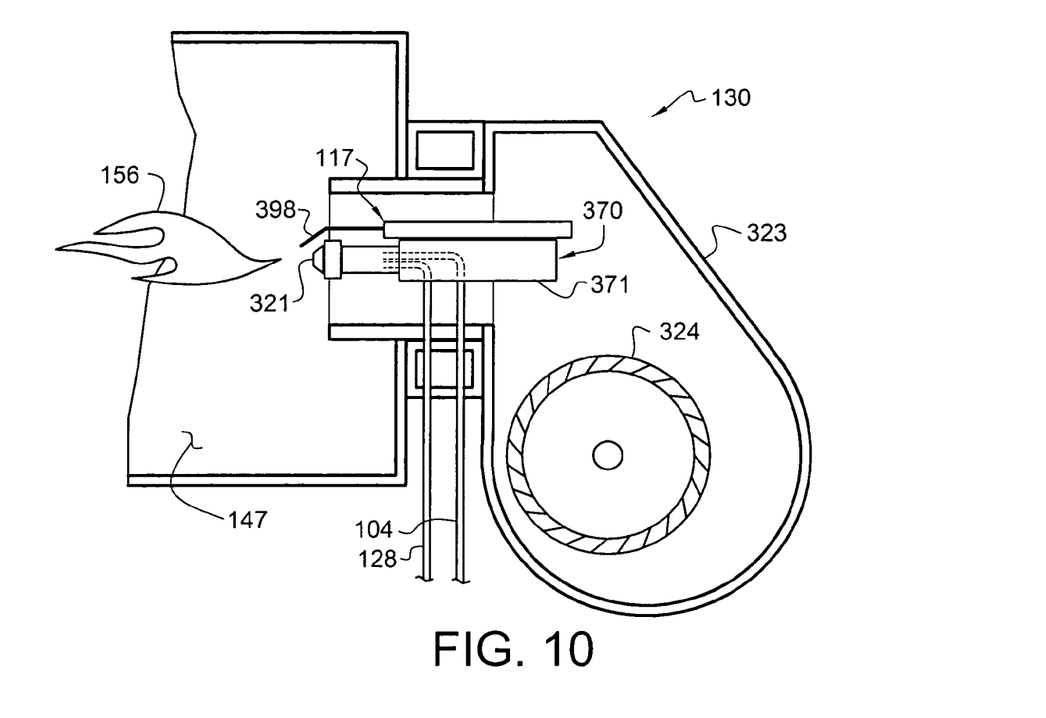
FIG. 10 is a sectional view through a typical waste oil combustor according to a preferred embodiment of the present invention.

FIG. 10 is a sectional view through typical waste oil combustor 130 according to the preferred embodiments of the present invention. It is noted that the configuration and operation of waste oil combustors (such as waste oil combustor 130) is described in greater detail in, for example, U.S. Pat. No. 6,048,197 to Beiler, incorporated herein by reference for further examples of implementation engineering.

As generally discussed in Bieler, waste oil combustor 130 includes burner nozzle 321 and ignition assembly 117 to create a flame from the supplied waste oil 104, as shown. Preferably, waste oil combustor 130 also includes housing 323 in which is mounted fan 324 to supply large quantities of combustion air over nozzle 321 and ignition assembly 117 to support the creation of flame 156 in combustion chamber 147, as shown.

Preferably, burner nozzle assembly 370 includes burner nozzle 321 and ignition assembly 117 (embodying herein igniter means for igniting such environmentally hazardous waste oils after such environmentally hazardous waste oils have passed through such atomizing means, and further embodying herein at least one igniter structured and arranged to ignite such environmentally hazardous waste oils after such environmentally hazardous waste oils have passed through such at least one atomizer), as shown. Preferably, burner nozzle 321 includes nozzle housing 371 having passageways for the flow of compressed air 128 and waste oil 104 in a known manner to create a flame projected into combustion chamber 147.

Preferably, preheated waste oil 104 flows into burner nozzle 321 (embodying herein atomizer means for atomizing such environmentally hazardous waste oils prior to combustion, and embodying herein at least one atomizer structured and arranged to atomize such environmentally hazardous waste oils prior to combustion) to exit in a fine stream. Meanwhile, preheated compressed air 128 preferably flows through another passageway into burner nozzle 321 where the flow of compressed air 128 is directed in a slightly spiraled path. Preferably, compressed air 128 and waste oil 104 are combined at the tip of burner nozzle 321 to effect an atomizing of the waste oil stream, resulting in a combined stream of compressed air and atomized waste oil droplets being ejected from the tip, whereupon it is ignited into a flame by the electrodes 398, of ignition assembly 117.

It should be noted that the term "environmentally hazardous waste oils", as used within this specification and the below claims, shall include within the definition, vegetable oils and similar oils used within the food industry. Furthermore, upon reading this specification, those with ordinary skill in the art will understand that, under appropriate circumstances, such as, for example, new industries, advances in processing technology, etc., the use of other oils, such as, synthetic oil, bio-engineered oils, etc., may suffice.

Although applicant has described applicant's preferred embodiments of this invention, it will be understood that the broadest scope of this invention includes such modifications as diverse shapes and sizes and materials. Such scope is limited only by the below claims as read in connection with the above specification. Further, many other advantages of applicant's invention will be apparent to those skilled in the art from the above descriptions and the below claims.

What is claimed is:

1. An electrical generation system comprising:
 a) electrical circuit means for utilizing electrical power;
 b) connected to said electrical circuit means, Stirling-cycle power means for using the mechanical output of at least one Stirling cycle to produce electrical power;
 c) holding means for holding environmentally hazardous waste oils;
 d) combustion heat means for producing combustion heat by burning such environmentally hazardous waste oils;
 e) waste oil transfer means for transferring such environmentally hazardous waste oils from said holding means to said combustion heat means; and
 f) primary heat transfer means for transferring of such combustion heat to said Stirling-cycle means;
 g) wherein said primary heat transfer means is in operational communication with said combustion heat means; and
 h) wherein such environmentally hazardous waste oils may be converted to electrical power;
 i) wherein said combustion heat means comprises:
  i) atomizer means for atomizing such environmentally hazardous waste oils prior to combustion; and
  ii) igniter means for igniting such environmentally hazardous waste oils after such environmentally hazardous waste oils have passed through said atomizing means.

2. The system according to claim 1 wherein said electrical circuit means comprises electrical network means for linking to at least one larger electrical grid.

3. The system according to claim 2 wherein said electrical network means further comprises electrical controller means for controlling electrical power within said electrical network means.

4. The system according to claim 3 wherein said electrical controller means is structured and arranged to control electrical power flowing between said electrical network means and the at least one larger electrical grid.

5. The system according to claim 3 wherein:
 a) said electrical network means further comprises electrical storing means for storing electrical power; and
 b) said electrical controller means is structured and arranged to control at least one transfer of electrical power between said electrical storing means and said electrical network means.

6. The system according to claim 1 further comprising secondary heat transfer means for transferring at least one portion of the combustion heat to at least one heatable fluid.

7. The system according to claim 6 wherein said secondary heat transfer means is structured and arranged to transfer heat to air, usable for space heating.

8. The system according to claim 6 wherein the heatable fluid comprises at least one liquid.

9. The system according to claim 1 wherein said holding means comprises collector means for collecting of such environmentally hazardous waste oils.

10. An electrical generation system comprising:
 a) electrical circuit means for utilizing electrical power;
 b) connected to said electrical circuit means, Stirling-cycle power means for using the mechanical output of at least one Stirling-cycle to produce electrical power;
 c) holding means for holding environmentally hazardous waste oils;

d) combustion heat means for producing combustion heat by burning such environmentally hazardous waste oils;
e) waste oil transfer means for transferring such environmentally hazardous waste oils from said holding means to said combustion heat means; and
f) primary heat transfer means for transferring of such combustion heat to said Stirling-cycle means;
g) wherein said primary heat transfer means is in operational communication with said combustion heat means; and
h) wherein such environmentally hazardous waste oils may be converted to electrical power;
i) pump means for pumping such environmentally hazardous waste oils from said holding means to said combustion heat means;
j) flow volume regulator means for regulating the flow volume of such environmentally hazardous waste oils pumped from said holding means to said combustion heat means; and
k) pre-heater means for preheating such environmentally hazardous waste oils prior to burning;
l) wherein said combustion heat means comprises:
 i) atomizer means for atomizing such environmentally hazardous waste oils prior to combustion.

11. An electrical generation system comprising:
a) at least one electrical circuit structured and arranged to utilize electrical power;
b) connected to said at least one electrical circuit, at least one Stirling-cycle engine structured and arranged to use the mechanical output of at least one Stirling cycle to produce electrical power;
c) at least one holder structured and arranged to hold environmentally hazardous waste oils;
d) at least one combustion heater structured and arranged to produce combustion heat by burning such environmentally hazardous waste oils;
e) at least one waste oil transfer component structured and arranged to transfer such environmentally hazardous waste oils from said at least one holder to said at least one combustion heater; and
f) at least one primary beat exchanger structured and arranged to transfer such combustion heat to said at least one Stirling-cycle engine;
g) wherein said at least one primary heat exchanger is in operational communication with said at least one combustion heater; and
h) wherein such environmentally hazardous waste oils may be converted to electrical power;
i) wherein said at least combustion heater comprises:
 i) at least one atomizer structured and arranged to atomize such environmentally hazardous waste oils prior to combustion; and
 ii) at least one igniter adapted to ignite such environmentally hazardous waste oils after such environmentally hazardous waste oils have passed through said at least one atomizer.

12. The system according to claim 11 wherein said at least one electrical circuit comprises at least one electrical network connected to at least one larger electrical grid.

13. The system according to claim 12 wherein said at least one electrical network further comprises at least one electrical controller structured and arranged to control electrical power within said at least one electrical network.

14. The system according to claim 12 wherein said at least one electrical controller is structured and arranged to control electrical power flowing between said at least one electrical network and the at least one larger electrical grid.

15. The system according to claim 12 wherein:
a) said at least one electrical network further comprises at least one electrical storage device structured and arranged to store electrical power; and
b) said at least one electrical controller is structured and arranged to control at least one transfer of electrical power between said at least one electrical storage device and said at least electrical network.

16. The system according to claim 11 further comprising at least one secondary heat exchanger structured and arranged to transfer at least one portion of the combustion heat to at least one heatable fluid.

17. The system according to claim 16 wherein said at least one secondary heat exchanger is structured and arranged to transfer heat to air, usable for space heating.

18. The system according to claim 16 wherein the heatable fluid comprises at least one liquid.

19. The system according to claim 11 wherein said at least one holder comprises at least one collector structured and arranged to assist in collecting such environmentally hazardous waste oils.

20. An electrical generation system comprising:
a) at least one electrical circuit structured and arranged to utilize electrical power;
b) connected to said at least one electrical circuit, at least one Stirling-cycle engine structured and arranged to use the mechanical output of at least one Stirling cycle to produce electrical power;
c) at least one holder structured and arranged to hold environmentally hazardous waste oils;
d) at least one combustion heater structured and arranged to produce combustion heat by burning such environmentally hazardous waste oils;
e) at least one waste oil transfer component structured and arranged to transfer such environmentally hazardous waste oils from said at least one holder to said at least one combustion heater; and
f) at least one primary heat exchanger structured and arranged to transfer such combustion heat to said at least one Stirling-cycle engine;
g) wherein said at least one primary heat exchanger is in operational communication with said at least one combustion heater; and
h) wherein such environmentally hazardous waste oils may be converted to electrical power;
i) at least one secondary heat exchanger structured and arranged to transfer at least one portion of the combustion heat to at least one heatable fluid;
j) wherein such combustion heat produced by said at least one combustion heater comprises at least one directed heat flow;
k) at least one portion of said at least one primary heat exchanger is positioned to be in thermal communication with such at least one directed heat flow; and
l) said at least one primary heat exchanger is structured and arranged to direct at least one portion of such at least one directed heat flow to at least one portion of said at least one secondary heat exchanger.

21. An electrical generation system comprising:
a) at least one electrical circuit structured and arranged to utilize electrical power;
b) connected to said al least one electrical circuit, at least one Stirling-cycle engine structured and arranged to use the mechanical output of at least one Stirling cycle to produce electrical power;
c) at least one holder structured and arranged to hold environmentally hazardous waste oils;

d) at least one combustion heater structured and arranged to produce combustion heat by burning such environmentally hazardous waste oils;
e) at least one waste oil transfer component structured and arranged to transfer such environmentally hazardous waste oils from said at least one holder to said at least one combustion heater; and
f) at least one primary heat exchanger structured and arranged to transfer such combustion heat to said at least one Stirling-cycle engine;
g) wherein said at least one primary heat exchanger is in operational communication with said at least one combustion heater; and
h) wherein such environmentally hazardous waste oils may be converted to electrical power;
i) at least one pump to pump such environmentally hazardous waste oils from said at least one holder to said at least one combustion heater;
j) at least one flow volume regulator adapted to regulate the flow volume of such environmentally hazardous waste oils pumped from said at least one holder to said at least one combustion heater; and
k) at least one pre-heater structured and arranged to preheat such environmentally hazardous waste oils prior to burning;
l) wherein said at least one combustion heater comprises:
  i) at least one atomizer for atomizing such environmentally hazardous waste oils prior to combustion.

22. An electrical generation system comprising:
a) at least one electrical circuit structured and arranged to utilize electrical power;
b) connected to said at least one electrical circuit, at least one Stirling-cycle engine structured and arranged to use the mechanical output of at least one Stirling cycle to produce electrical power;
c) at least one holder structured and arranged to hold environmentally hazardous waste oils;
d) at least one combustion heater structured and arranged to produce combustion heat by burning such environmentally hazardous waste oils;
e) at least one waste oil transfer component structured and arranged to transfer such environmentally hazardous waste oils from said at least one holder to said at least one combustion heater; and
f) at least one primary heat exchanger structured and arranged to transfer such combustion heat to said at least one Stirling-cycle engine;
g) wherein said at least one primary heat exchanger is in operational communication with said at least one combustion heater; and
h) wherein such environmentally hazardous waste oils may be converted to electrical power;
i) at least one power producing site having at least one said electrical circuit, and at least one operation to generate such environmentally hazardous waste oils;
j) wherein the at least one operation is performed within the power producing site;
k) wherein at least one said electrical circuit generates electrical power and at least one useful form of usable energy selected from the group consisting of;
  i) heated air,
  ii) heated liquid,
l) wherein said at least one combustion heater has a maximum capacity of not more than 0.5 million BTU input per hour; and
m) wherein combustion gasses produced by the combustion of such environmentally hazardous waste oils is vented to the outside air.

23. The system according to claim 22 wherein the at least one operation comprises collection of the waste oil from at least one non-commercial source.

* * * * *